April 17, 1951   J. E. BECKER   2,548,857
FLUID CIRCULATION CONTROL FOR FLUID COUPLINGS
Filed Feb. 25, 1948   2 Sheets-Sheet 1
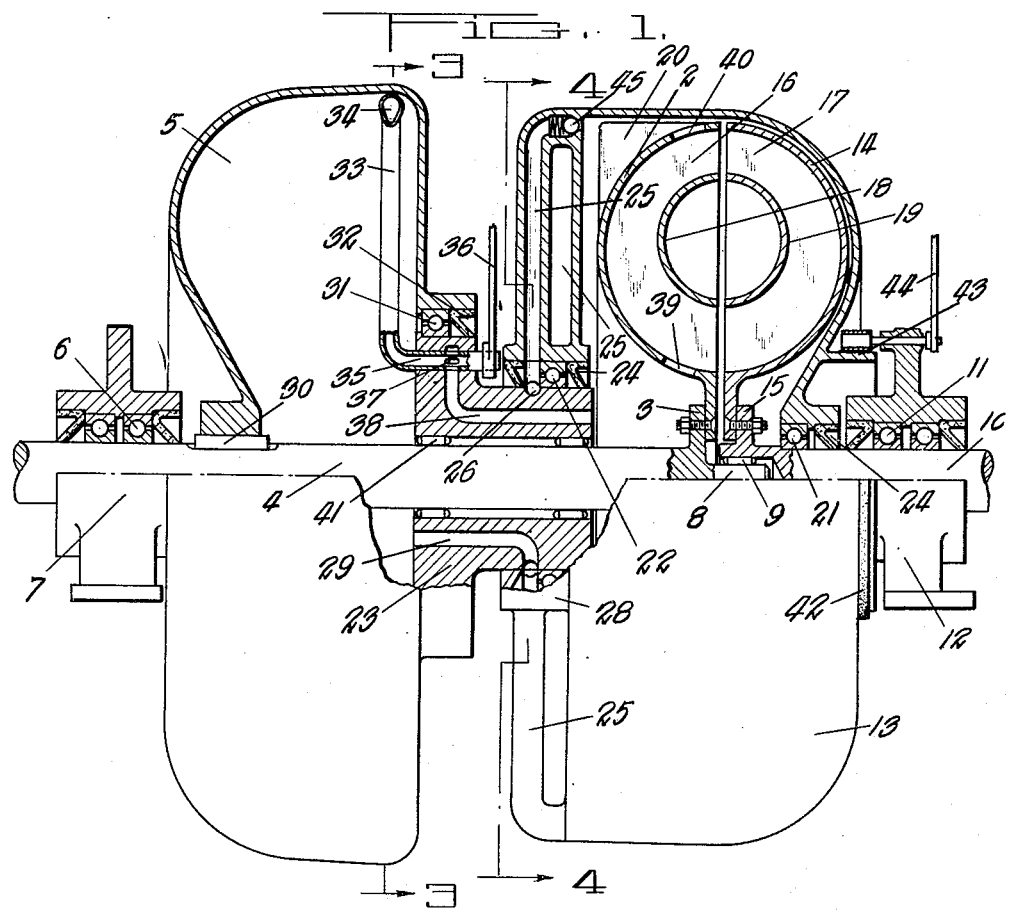
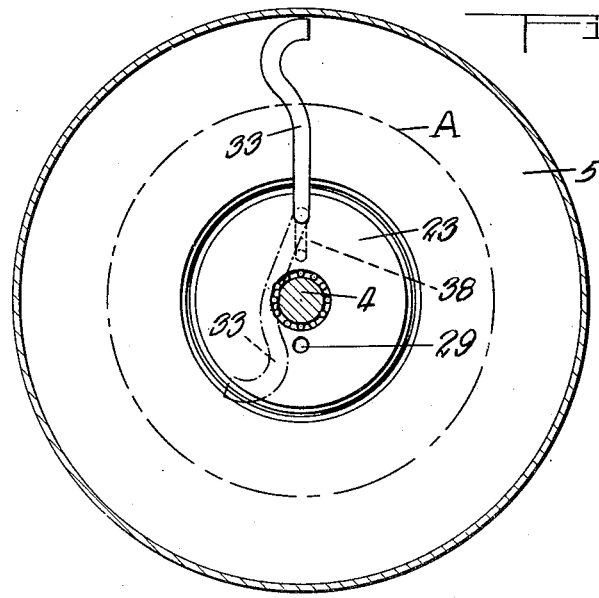
Inventor
JOHN E. BECKER
By
Attorney April 17, 1951 J. E. BECKER 2,548,857
FLUID CIRCULATION CONTROL FOR FLUID COUPLINGS
Filed Feb. 25, 1948 2 Sheets-Sheet 2

Inventor
JOHN E. BECKER
By
Attorney

Patented Apr. 17, 1951

2,548,857

UNITED STATES PATENT OFFICE 2,548,857

FLUID CIRCULATION CONTROL FOR FLUID COUPLINGS

John Edward Becker, Darlington, Ontario, Canada, assignor to Atlas Polar Company Limited, Toronto, Ontario, Canada, a corporation of Canada Application February 25, 1948, Serial No. 10,614

4 Claims. (Cl. 60—54)

The invention relates to improvements in fluid circulation controls for fluid couplings and is a continuation-in-part of my patent application Serial Number 744,000, filed April 25, 1947, now Patent No. 2,539,004, wherein I disclosed a coupling housing containing an impeller and a runner, the housing being normally free to rotate with the impeller, and the impeller furnished with centrifugal pump vanes and a braking mechanism provided to govern the rotative speed of the housing whereby a varying speed differential between the centrifugal pump vanes and the housing is established, with a resultant pumping action to remove fluid from the coupling.

The object of the present invention is to provide a fluid reservoir which is rotatable in conjunction with a fluid coupling arrangement as disclosed in my Patent No. 2,539,004, and wherein the fluid in the rotating fluid reservoir is in the form of a centrifugal fluid ring, a scoop pipe being contained within the reservoir for removing fluid therefrom and directing it into the impeller housing, such scoop pipe being of the type disclosed in my patent application Serial Number 749,562, filed May 21, 1947, issued May 23, 1950, as Patent No. 2,508,442.

With the foregoing and other objects in view as shall hereinafter appear, my invention consists of a fluid circulation control for fluid couplings constructed and arranged all as hereinafter more particularly described and illustrated in the accompanying drawings in which:

Fig. 1 is a side elevational view of the coupling and reservoir assembly, the upper portion thereof being shown in section.

Fig. 3 is a transverse cross-sectional view taken through the line 3—3, Fig. 1.

Like characters of reference indicate corresponding parts in the different views of the drawing.

Figure 2:
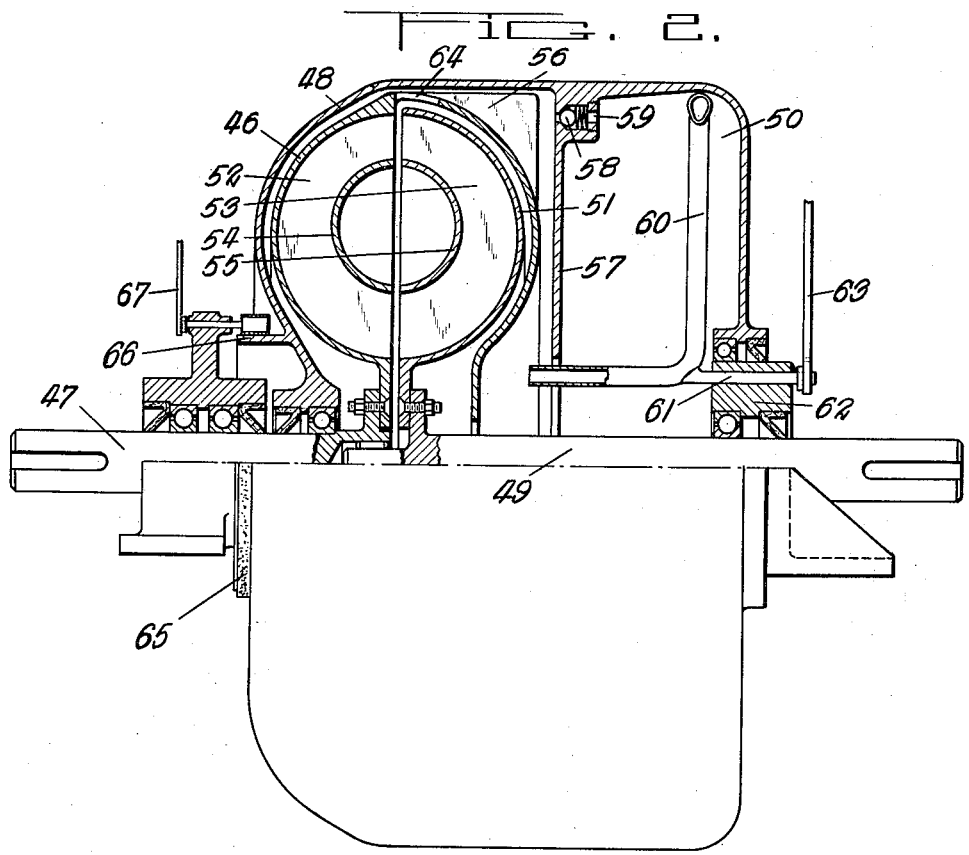
Fig. 2 is a similar view to Fig. 1, showing an alternative form of coupling housing construction wherein the reservoir and coupling housing are formed in a single unit.
Figure 4:
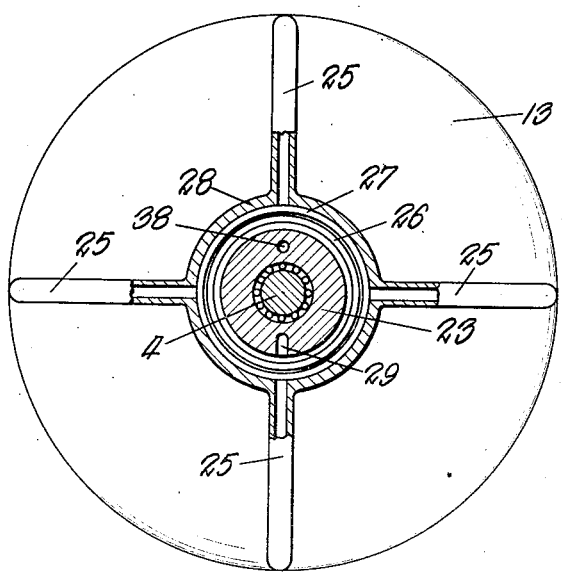
Fig. 4 is a transverse cross-sectional view taken through the line 4—4, Fig. 1.

Referring to the assembly shown in Fig. 1, an impeller 2 of concave ring-shaped form is secured to a flange 3 on the inner end of a driving shaft 4 which extends through the rotatable fluid reservoir 5 and is carried by a ball race 6 mounted within a bracket 7 exteriorly of the reservoir 5. The inner end of the driving shaft 4 has a reduced diameter portion 8 extending into a needle bearing 9 contained within the inner end of the driven shaft 10. The driven shaft 10 is supported by a roller race 11 within a bracket 12 which is positioned exteriorly of the rotatable coupling housing 13 and through which the driven shaft 10 extends.

The coupling housing 13 contains a concave ring-shaped runner 14 which has its central portion attached to a flange 15 on the inner end of the driven shaft 10. The impeller 2 and the runner 14 carry a plurality of the usual radial blades 16 and 17 and support the usual ring members 18 and 19, whereby passages for the fluid transmission of power are constituted.

The outer face of the impeller 2 carries a plurality of substantially radially positioned fins which act in the capacity of centrifugal pump vanes 20. The coupling housing 13 is shaped to follow the contour of the runner 14 and the impeller 2 with its pump vanes 20. The housing 13 is mounted for free rotation upon a pair of ball races; one ball race 21 being carried upon the driven shaft 10 and the other ball race 22 carried upon a hub 23 extending between the reservoir 5 and the coupling housing 13. In order to prevent the escape of fluid from the coupling housing 13, seal rings 24 are furnished within the vicinity of the ball races 21 and 22.

For the removal of fluid from the coupling housing 13, the housing is formed with a plurality of radially positioned conduits 25 which extend from the peripheral portion of the housing 13 to the hub 23. The hub 23 is formed with a groove 26 in its outer face which is complementary to a groove 27 in a rotatable closure collar 28 to which the conduits 25 extend. The conduits 25 open into the ring-shaped passage formed by the grooves 26 and 27, and such passage is in communication with a passage 29 extending longitudinally of the stationary hub 23 and communicating with the rotatable reservoir 5. It will thus be seen that fluid may pass from the rotating coupling housing through the rotating conduits 25 into the fluid reservoir 5.

The fluid reservoir 5 is secured to the driving shaft 4 in a fluid tight manner and anchored against rotation on the shaft by a key 30. The wall of the reservoir 5 adjacent to the coupling housing is carried by a ball race 31 and a fluid seal ring 32 is provided. It will thus be understood that the reservoir 5 rotates with the driving shaft 4.

In order to remove fluid from the rotating reservoir 5 and inject it into the coupling housing, a swingable scoop pipe 33 is contained within the reservoir and has its outer end formed with a suitable intake orifice 34 directed towards the direction of rotation of a centrifugal fluid ring A, as indicated in Fig. 3. The scoop pipe is carried upon the end of a length of pipe 35 extending substantially parallel to the driving shaft 4 and positioned within the hub 23. The length of pipe 35 is rotatably contained within the hub, being sealed at its outer end and carrying an operating handle 36 whereby movement of such handle will swing the scoop pipe into and out of the fluid ring A, as will be understood upon reference to Fig. 3. The rotatable pipe 35 carrying the scoop pipe 34 is formed with a plurality of orifices 37 through which communication is established between the scoop pipe and a passage 38 extending through the hub 23 and opening into the coupling housing 13. The impeller ring 2 is formed with a plurality of fluid inlet and fluid outlet orifices 39 and 40 so that fluid may be injected into the impeller through the orifices 39 and bled therefrom through the orifices 40, as occasion demands. The driving shaft 4 extends through the hub 23 and is mounted within several needle bearing races 41 carried within the hub.

The rotative movement of the coupling housing 13 may be controlled by any suitable brake arrangement. In Fig. 1 I show a band brake 42 surrounding a flange 43 on the housing and actuated by a brake handle mechanism 44. In order to obviate any possibility of fluid backing up from the rotating reservoir 5 through the conduits 25 into the periphery of the coupling housing 13, I furnish ball check valves 45 positioned in the outer ends of the conduits 25.

Operation:

When the coupling is transmitting power from the driving shaft 4 to the driven shaft 10, fluid circulates between the impeller 2 and the runner 14 in the usual manner. During the transmission of power a centrifugal fluid ring is formed within the coupling housing 13 exteriorly of the impeller 2, and the impeller 2, runner 14, and the housing 13 with its fluid ring rotate in unison. As the reservoir 5 is secured to the driving shaft 4 it will rotate therewith and the fluid therein will be in the form of a centrifugal fluid ring A, as illustrated in Fig. 3. When fluid is not being injected into the coupling housing, the scoop pipe 33 is in the position shown in dotted lines in Fig. 3, wherein it is withdrawn from the fluid ring.

If it is desired to remove a certain proportion, or all of the fluid, from the coupling housing 13, the brake 44 is applied whereby the rotative speed of the coupling housing 13 is reduced or brought to a standstill. Immediately the rotative speed of the coupling housing falls below the rotative speed of the impeller ring 2 with its pump vanes 20, such vanes will pump fluid from the housing 13 through the radial conduits 25 into the reservoir 5.

If it is desired to inject fluid from the rotating reservoir 5 into the coupling housing 13, it is only necessary to swing the scoop pipe 33 from the position shown in dotted lines towards the position shown in full lines in Fig. 3, whereby fluid will flow through the scoop pipe 33, pipe 35, and passage 38 into the coupling housing 13 and enter the impeller ring 2 through the orifices 39. It will be apparent that by adjustment of the brake 44 and adjustment of the position of the scoop pipe 33 it will be possible to secure very accurate speed differential adjustments, and that when desired the coupling housing 13 may be filled with or drained of fluid instantaneously.

The construction illustrated in Fig. 2 embodies the same principle as the construction shown in Fig. 1, with the exception that in this case the fluid reservoir constitutes an extension of the coupling housing.

In the construction illustrated in Fig. 2, an impeller housing 46 of orbicular form is carried upon the inner end of a driving shaft 47 and contained within a coupling housing 48. A driven shaft 49 extends through the fluid reservoir 50 which is an extension of the coupling housing 48, and the inner end of the driven shaft 49 carries a runner 51 mounted within the impeller housing 46. The impeller and runner contain the usual impeller and runner blades 52 and 53 which support the usual ring members 54 and 55.

The outer portion of the impeller housing 46 carries a plurality of centrifugal pump vanes 56 which have the same function as the vanes 20 in the construction shown in Fig. 1. The partition wall 57 between the impeller housing and the reservoir 50 contains one or more fluid bleeding orifices 58 controlled by one-way check valves 59 which permit fluid to be pumped from the housing 48 and through the orifices 58 into the reservoir 50.

A swingable scoop pipe 60 is contained within the reservoir 50 and carried upon a rotatable spindle 61 extending through the bearing boss 62 and provided with a manipulating handle 63. The inner end of the scoop pipe 60 has a right-angled pipe portion which lies substantially parallel to the driven shaft 49 and extends through the bottom portion of the partition 57 into the coupling housing 48.

The coupling housing 48 with its fluid reservoir 50 is freely rotatably mounted and is normally rotated under the action of the rotative movement of the fluid in the coupling assembly, the fluid being free to pass from the peripheral portion of the impeller to the peripheral portion of the housing through the orifices 64 in the impeller housing. In order to govern the rotative movement of the impeller housing and reservoir a suitable brake mechanism may be used, as for example a brake band 65 surrounding the flange 66 on the coupling housing 48 and actuatable under movement of the brake handle 67.

Operation:

When the coupling is in operation, fluid is contained within the coupling housing 48 and circulates between the impeller housing 46 and the contained runner 51 in the usual manner. Fluid is of course also contained in the peripheral portion of the housing 48 and rotates with such housing in conjunction with the pump vanes 56.

If it is desired to remove all or part of the fluid from the coupling housing 48, the brake 67 is applied to slow down the rotative speed of the housing 48 wherein the pump vanes 56 will set up a pumping action under the influence of the speed differential and cause fluid to pass through the orifices 58 into the reservoir 50, wherein the contained fluid is in the form of a centrifugal fluid ring.

The return of fluid from the reservoir 50 into the coupling housing 48 is obtained by actuation of the scoop pipe 60 through the medium of the handle 63, such scoop pipe having the same operative movements as the scoop pipe 33 shown in Figs. 1 and 3 of the drawings.

From the foregoing description it will be apparent that any desired speed ratios from a full driving speed of the driven shaft through a progressive range down to a standstill and vice versa may be obtained from couplings constructed according to my invention as herein set forth, and as the fluid reservoir rotates concentrically with the coupling and may be provided of substantially the same diameter as that of the coupling, I have devised a very compact and self-contained unit having a simple and positive operation achieved by a minimum number of moving parts.

What I claim as my invention is:

1. A fluid coupling comprising a driving shaft, a driven shaft, a bearing assembly in which the driving shaft is mounted, a bearing assembly in which the driven shaft is mounted, an orbicular impeller shell of substantially 8-shaped cross-section and which is secured to the driving shaft, a plurality of radial impeller blades contained within one half of the shell, a concave ring-shaped runner housing secured to the driven shaft and contained within the other half of the impeller shell, a plurality of radial runner blades contained within the runner housing and adapted to be driven by the impeller blades through the medium of a fluid, a freely rotatable coupling housing in which the impeller shell is contained, radially positioned centrifugal pump fins protruding from the outer face of the portion of the impeller shell in which the runner housing is contained, the impeller shell being pierced with fluid inlet and outlet orifices adjacent to the fins, bearing assemblies upon the driving shaft and the driven shaft and upon which the rotatable housing is freely mounted, a fluid reservoir forming an extension of the coupling housing and rotating therewith, a brake controlling the rotative speed of the coupling housing and fluid reservoir, a swingably mounted fluid scoop pipe contained within the fluid reservoir and communicating with the coupling housing, and means for swinging the scoop pipe into and out of engagement with the centrifugal fluid ring formed in the rotating fluid reservoir.

2. A fluid coupling assembly as claimed in claim 1, wherein the centrifugal pump fins protrude from the peripheral portion of the impeller shell and the fluid inlet and outlet orifices are positioned between the fins.

3. A fluid coupling assembly as claimed in claim 1, wherein a partition wall is positioned between the coupling housing and fluid reservoir and is formed with a central orifice, the inner end of the scoop pipe extending through said orifice from the fluid reservoir to the coupling housing.

4. A fluid coupling assembly as claimed in claim 1, wherein a partition wall is positioned between the coupling housing and fluid reservoir and is formed with a central orifice, the inner end of the scoop pipe extending through said orifice from the fluid reservoir to the coupling housing, and wherein the centrifugal pump fins protrude from the peripheral portion of the impeller shell and the fluid inlet and outlet orifices are positioned between the fins.

JOHN EDWARD BECKER.

REFERENCES CITED

The following references are of record in the file of this patent:

UNITED STATES PATENTS

| Number | Name | Date |
| --- | --- | --- |
| 2,187,656 | Kiep et al. | Jan. 16, 1940 |
| 2,343,786 | Martin | Mar. 7, 1944 |